(12) United States Patent
Sukegawa et al.

(10) Patent No.: US 8,774,247 B2
(45) Date of Patent: Jul. 8, 2014

(54) ECHELLE DIFFRACTION GRATING, EXCIMER LASER, MANUFACTURING METHOD OF ECHELLE DIFFRACTION GRATING, AND ARF EXCIMER LASER

(71) Applicant: Canon Kabushiki Kaisha, Tokyo (JP)

(72) Inventors: Takashi Sukegawa, Utsunomiya (JP);
Tsuyoshi Kitamura, Utsunomiya (JP);
Yukinobu Okura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/633,343

(22) Filed: Oct. 2, 2012

(65) Prior Publication Data

US 2013/0089117 A1    Apr. 11, 2013

(30) Foreign Application Priority Data

Oct. 6, 2011  (JP) ................................. 2011-222367
Sep. 26, 2012  (JP) ................................. 2012-211640

(51) Int. Cl.
*H01S 3/22*       (2006.01)
(52) U.S. Cl.
USPC ........................... 372/57; 372/50.11; 372/102
(58) Field of Classification Search
USPC .................. 372/50.11, 57, 102; 359/558, 571
See application file for complete search history.

(56) References Cited

U.S. PATENT DOCUMENTS

| | | | |
|---|---|---|---|
| 4,736,360 A | 4/1988 | McMahon | |
| 5,999,318 A | 12/1999 | Morton et al. | |
| 6,067,197 A | 5/2000 | Blasiak et al. | |
| 6,449,096 B1 | 9/2002 | Fabiny et al. | |
| 7,175,773 B1 | 2/2007 | Heidemann et al. | |
| 2001/0003035 A1 | 6/2001 | Ozarski et al. | |
| 2002/0001672 A1 | 1/2002 | Pan et al. | |
| 2010/0226014 A1* | 9/2010 | Taira et al. | 359/571 |
| 2011/0222042 A1* | 9/2011 | Iizuka et al. | 355/71 |

FOREIGN PATENT DOCUMENTS

| | | |
|---|---|---|
| JP | 2000-214315 A | 8/2000 |
| JP | 3673686 B2 | 7/2005 |

OTHER PUBLICATIONS

Feb. 1, 2013 European Search Report in European Patent Appln. No. 12006852.3.

* cited by examiner

*Primary Examiner* — Yuanda Zhang
(74) *Attorney, Agent, or Firm* — Fitzpatrick, Cella, Harper & Scinto (57) ABSTRACT

An Echelle diffraction grating has a Littrow configuration. Each grating includes a resin layer made of light curing resin and having a thickness between 2 μm and 10 μm, and a reflective coating layer formed on the resin layer, having a thickness between 120 nm and 500 nm, and made of aluminum. An apex angle between a blazed surface and a counter surface is between 85° and 90°. A first blaze angle is an angle that maximizes diffraction efficiency of a set blazed order for incident light of a wavelength of 193.3 nm. A blaze angle has an initial value of a second blaze angle smaller than the first blaze angle. $0.25° \leq bd - ba \leq 1.2°$ is satisfied where bd denotes the first blaze angle and ba denotes the second blaze angle.

9 Claims, 4 Drawing Sheets

ECHELLE DIFFRACTION GRATING, EXCIMER LASER, MANUFACTURING METHOD OF ECHELLE DIFFRACTION GRATING, AND ARF EXCIMER LASER

BACKGROUND OF THE INVENTION

1. Field of the Invention

The present invention relates to an Echelle diffraction grating, excimer laser, a manufacturing method of an Echelle diffraction grating, and an ArF excimer laser.

2. Description of the Related Art

It is difficult to manufacture a diffraction grating configured to select the wavelength in an excimer laser. Only an imprinting machine called a ruling engine can manufacture the diffraction grating all over the world, and it is configured to manufacture a very high-quality grating. Since it is therefore very arduous to manufacture a different diffraction grating for each of a plurality of different wavelengths, it is demanded to manufacture a diffraction grating commonly usable for a plurality of different wavelengths. Since the above diffraction grating is an optical component in a laser resonator, it is important to provide high diffraction efficiency and durability for a long-term service. A reflection type Echelle diffraction grating (blazed diffraction grating) has an asymmetric triangular lattice on a lattice section (grating section) and is known as an applicable diffraction grating.

In the Echelle diffraction grating, the blazed surface constitutes one side of the triangular section of the grating and has a large influence on the diffraction efficiency. As disclosed in U.S. Pat. No. 5,999,318, the lattice of the Echelle diffraction grating can include a resin layer having a triangular section and made of light curing resin, such as epoxy resin and acrylic resin, and a reflective layer (aluminum film) formed on a surface of the resin layer.

Japanese Patent No. 3,673,686 discloses an Echelle diffraction grating commonly usable for excimer lasers of two kinds of wavelengths, such as an ArF excimer laser and a KrF excimer laser (wavelength 248.4 nm). Japanese Patent No. 3,673,686 discloses an idea to determine a shape of the Echelle diffraction grating so as to improve the blazed diffraction of the laser beams irradiated with two types of wavelengths. The Echelle diffraction grating satisfies $f=1/\{(m_1+1)\lambda_1 - m_1\lambda_1/2\}$, where $m_1$ is a diffraction order of a shorter wavelength, $\lambda_1$ is the shorter wavelength, and f is the number of triangular grooves or a reciprocal ($f=1/d$) of a repetition pitch d of the lattice.

However, in the Echelle diffraction grating used for the ArF excimer laser, the reflective coating layer of the blazed surface gradually curves (deforms) from the plane shape as a result of a long-term use and gets deteriorated due to the lattice shape or a phenomenon that causes an equivalent effect. As a result, the convergence of a specific order of the diffracted light flux changes and the diffraction efficiency lowers. The deformation of the blazed surface progresses due to the continuous uses, and it is difficult to avoid the deterioration of the diffraction efficiency of a desired order in that state.

The conventional Echelle diffraction grating used for the ArF excimer laser has such an initial shape that the diffraction efficiency has a peak, but the efficiency lowers as a result of a long-term use and finally comes off from the tolerance.

SUMMARY OF THE INVENTION

The present invention provides an Echelle diffraction grating that can maintain diffraction efficiency for a long-term use.

An Echelle diffraction grating according to the present invention includes a plurality of gratings, each of which has an asymmetrical triangular shape on a section in which the plurality of gratings are arranged. Each grating includes a resin layer made of light curing resin and having a thickness between 2 μm and 10 μm, and a reflective coating layer formed on the resin layer, having a thickness between 120 nm and 500 nm, and made of aluminum. The Echelle diffraction grating has a Littrow configuration in which a direction of incident light accords with a direction of diffracted light. Each grating receives and diffracts the incident light on a blazed surface corresponding to a short side of the asymmetrical triangular shape, an apex angle between the blazed surface and a counter surface corresponding to a long side of the asymmetrical triangular shape being between 85° and 90°. A blaze angle between the blazed surface and a lattice plane has an initial value of a second blaze angle smaller than a first blaze angle that maximizes diffraction efficiency of a set blazed order for incident light of a wavelength of 193.3 nm. The following conditional expression is satisfied where bd denotes the first blaze angle, and ba denotes the second blaze angle: $0.25° \leq bd - ba \leq 1.2°$.

Further features of the present invention will become apparent from the following description of exemplary embodiments with reference to the attached drawings.

DESCRIPTION OF THE EMBODIMENTS

Figure 1A:
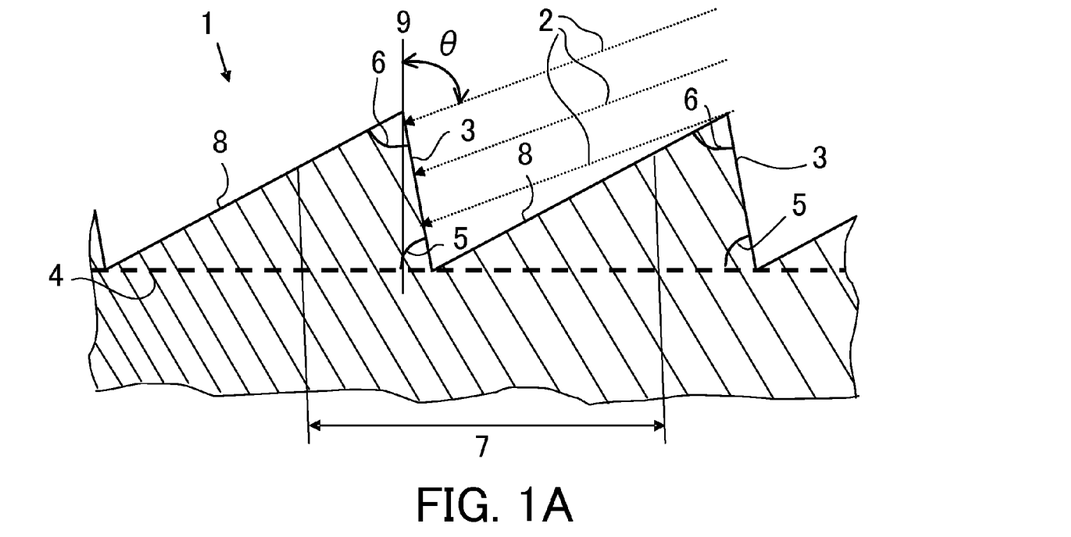
FIGS. 1A and 1B are partially enlarged sectional views of an Echelle diffraction grating according to this embodiment.

FIG. 1A is a partially enlarged sectional view of an Echelle diffraction grating (blazed diffraction grating) 1 according to this embodiment, and this figure illustrates part of a lattice section (grating section) in which a plurality of gratings are arranged. The Echelle diffraction grating 1 is applicable to an ArF excimer laser. In this case, the Echelle diffraction grating 1 has a mirror and a wavelength-selective function, and thus loses a laser function unless the constant diffraction efficiency is maintained.

Each grating includes a blazed surface 3 that is a facet with a short side of an asymmetrical triangular shape on the section illustrated in FIG. 1A, and a counter surface 8 that is an anti-facet adjacent to the blazed surface 3 and has a long side of the asymmetrical triangular shape. In this embodiment, the blazed surface 3 having the short side receives incident light 2 having a wavelength of 193.3 nm most from a light source (not illustrated). However, in another embodiment, the counter surface 8 having the long side receives the incident light 2 most, and in this case the surface having the long side will be referred to as a blazed surface.

An angle between the blazed surface 3 and a lattice plane (grating plane) 4 is referred to as a blaze angle 5. An angle between the blazed surface 3 and the counter surface 8 is referred to as an apex angle 6. Reference numeral 7 denotes a repetitive pitch of the lattice. This embodiment sets the apex angle 6 to an angle smaller than 90° (in particular in a range between 85° and 90°). This is because the incident light 2 reaches the counter surface 8 when a sum of the apex angle 6 and the blaze angle 5 is larger than a sum of the incident angle θ of the light and 90°, and thus this configuration attempts to prevent the light from entering the counter surface when the effective blaze angle 5 and incident angle θ are considered.

An order having the highest diffraction energy amount is referred to as a "blazed order" among light fluxes in a certain usable order range of a predetermined wavelength incident at a predetermined incident angle upon the Echelle diffraction grating 1. A configuration of the Echelle diffraction grating in which the incident light and the diffracted light of the blazed order have the equal paths is referred to as a "Littrow configuration." The Echelle diffraction grating 1 has the Littrow configuration.

As illustrated, in the Echelle diffraction grating 1 having the Littrow configuration, the incident angle θ of the incident light having the blazed order is equal to an angle between the incident light 2 and a grating normal 9 perpendicular to the lattice plane 4. The incident light 2 may perpendicularly enter the blazed surface 3, but enters the blazed surface 3 slightly obliquely in this embodiment. Therefore, in this embodiment, the angle θ of the blazed order is close to but is not equal to the blaze angle 5.

It is known that the following conditional expression is satisfied in the Echelle diffraction grating 1 having the Littrow configuration, where m is a blazed order, λ is a wavelength of the light source of the incident light 2 (therefore which is 193.3 nm in this case), d is a repetitive pitch 7, and θ is an angle of the blazed order:

$$m\lambda = 2d \cdot \sin\theta \quad (1)$$

It is understood from Expression 1 that the order m is uniquely determined once the angle θ of the incident light 2, the repetitive pitch 7, and the wavelength λ of the incident light source are selected.

Figure 1B:
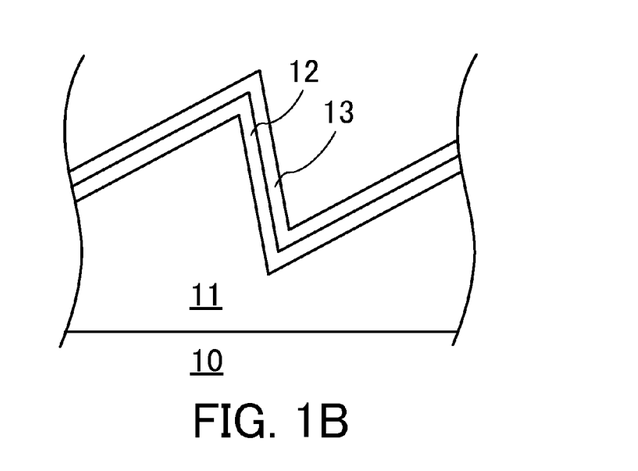

FIG. 1B is a schematic view of a structure of FIG. 1A. The Echelle diffraction grating includes a resin layer 11 having a triangular section made of light curing resin, such as epoxy resin and acrylic resin, on a glass substrate 10, a reflective coating layer 12 made of aluminum formed on a surface of the resin layer 11, and a protective layer 13 configured to protect the reflective coating layer 12 from being oxidized and formed on the reflective coating layer 12. The protective layer 13 is made of a dielectric film, such as $LaF_3$ film and an $MgF_2$ film.

The structure illustrated in FIG. 1B is merely illustrative, and another reflective coating layer may be laminated on the protective layer 13, or the protective layer 13 may be made by laminating a plurality of types of dielectric films, as disclosed in U.S. Pat. No. 5,999,318.

The Echelle diffraction grating 1 is applied to the diffractive element for the ArF excimer laser, the diffraction efficiencies before and after the laser beam irradiations are measured, and it is determined whether or not the diffraction efficiency decreases. More specifically, the diffraction efficiencies of the blazed order m and the order m+1 that is higher by one order in the Echelle diffraction grating 1 having the Littrow configuration are measured and the ratio (%) between them (m+1-th order diffraction efficiency/m-th order diffraction efficiency) is calculated.

Figure 2:
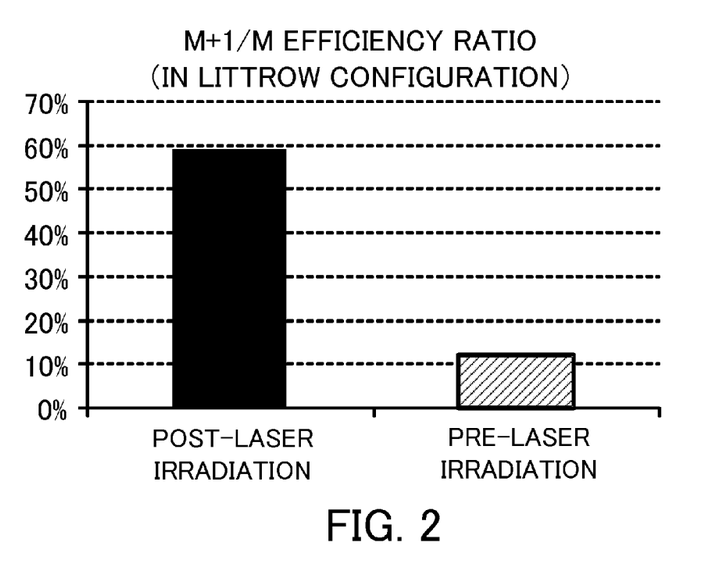
FIG. 2 is a graph illustrating diffraction efficiency ratios between the m-th order diffracted light and the m+1-th order diffracted light before and after the laser irradiations.

As illustrated in FIG. 2, the diffraction efficiency ratio of m+1/m is 12% before the laser irradiation but increases up to 59% after the laser irradiation. FIG. 2 is a graph illustrating the diffraction efficiency ratios between the m-th order diffracted light and the m+1-th order diffracted light before and after the laser irradiations.

As a result of zealous study, this cause is identified as the surface oxidation of the diffraction grating (which will cause the reflectance drop) and deformations of the reflective coating layer 12 or the resin layer 11 itself under the reflective coating layer 12 of the lattice (in particular, the blazed surface 3). Due to the surface oxidation and deformation of the diffraction grating, a diffracting direction of the diffracted light varies and the diffraction efficiency lowers.

The instant inventors have also discovered that the deterioration of this lattice progresses to some extent and then the shape becomes stable. The drop of the diffraction efficiency caused by the deterioration occurs in a direction where the m+1-th order becomes stronger, and its amount corresponds to a changing amount of the diffraction efficiency as if the set blaze angle increased by 1.4° at most. This occurs similarly when the resin layer 11 is made of light curing resin with a thickness of 2 μm to 10 μm and the reflective coating layer 12 is made of aluminum with a thickness of 120 nm to 500 nm. For example, it occurs similarly irrespective of the type of the resin of the resin layer 11 and the type of the material of the protective layer 13.

An energy amount of the laser beam of the KrF excimer laser is smaller than that of the ArF excimer laser. It is also found that the influence of the reflective coating layer 12 of the blazed surface 3 (the deterioration of the diffraction efficiency) can be ignored when the thicknesses of resin layer 11 and reflective coating layer 12 are set as described above. For example, the irradiation of the laser beam from the KrF excimer laser becomes influential if the thickness of the reflective coating layer 12 becomes much smaller than 120 nm.

It is also found that setting the reflective coating layer 12 as the aluminum film to be thicker than 500 nm in the ArF excimer laser is ineffective in preventing the diffraction efficiency from decreasing. In other words, it is found that the non-negligible reduction of the diffraction efficiency is a peculiar problem of the ArF excimer laser to which the Echelle diffraction grating 1 is applied.

Figure 3:
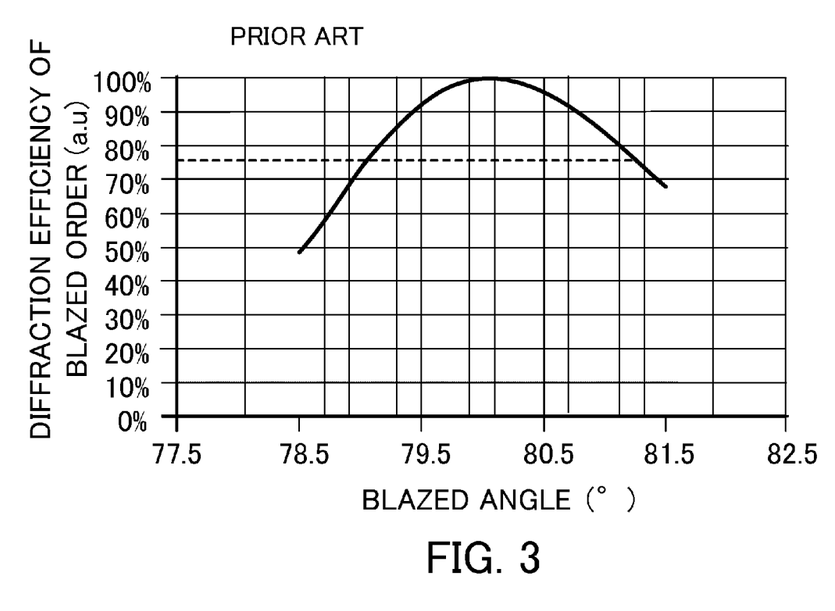
FIG. 3 is a graph illustrating a relationship between a blazed angle and diffraction efficiency of a blazed order when an apex angle is 82.5° in a conventional Echelle diffraction grating.

FIG. 3 is a graph that illustrates a relationship between the blazed angle 5 when the apex angle 6 is 82.5° and the diffraction efficiency of the blazed order. The abscissa axis denotes the blaze angle 5 (°), and the ordinate axis denotes the diffraction efficiency of the blazed order (arbitrary unit). As illustrated, the blaze angle has an angle that maximizes the diffraction efficiency of the blazed order. Thereby, the specific order is blazed.

The conventional diffraction grating has an apex angle 6 smaller than 85°, such as 82.5°, so as to prevent the incident light 2 from expose dust, etc. that occurs on the counter surface 8 when the diffraction grating is manufactured by the imprinting machine.

Moreover, the conventional ArF excimer laser includes the Echelle diffraction grating 1 in which the blaze angle is set to an angle, such as 80.1° in FIG. 3, which maximizes the diffraction efficiency of the blazed order and thus the diffraction efficiency of the blazed order decreases from the peak value due to the above deformation of the lattice. As described above, this drop corresponds to a change as if the blaze angle 5 increased by 1.4° at most, and this corresponds to a change of the blaze angle 5 from 80.1° to 81.5°. As a consequence, the diffraction efficiency decreases from 100% to 66% in view of FIG. 3. Hence, the diffraction efficiency of the blazed order becomes 66% after it becomes stable as a result of a long-term use, and comes off from the tolerance.

Accordingly, this embodiment manufactures a diffraction grating through cutting operations, and uses the diffraction grating having the apex angle 6 set to an angle in a range between 85° and 90°. Moreover, instead of setting to the blaze angle 5 a first blaze angle that maximizes the diffraction efficiency of the set first blazed order, this embodiment sets a second blaze angle smaller than the first blaze angle to the blaze angle 5.

Figure 4:
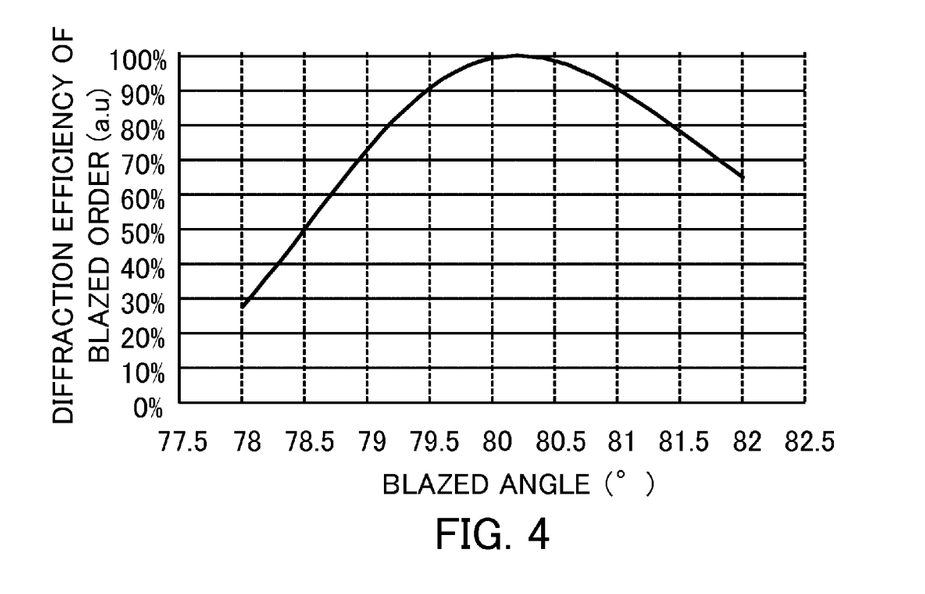
FIG. 4 is a graph illustrating a relationship between a blazed angle and diffraction efficiency of a blazed order when an apex angle is 89° in the Echelle diffraction grating illustrated in FIG. 1A.

FIG. 4 is a graph illustrating a relationship between the blaze angle 5 when the apex angle 6 is 89° and the diffraction efficiency of the blazed order. The abscissa axis denotes the blaze angle 5 (°) and the ordinate axis denotes the diffraction efficiency of the blazed order (arbitrary unit). As illustrated, the blaze angle has an angle that maximizes the diffraction efficiency of the blazed order. Thereby, a specific order is blazed. It is understood as a result of a comparison with FIG. 3 that is an approximately symmetrical graph with respect to 80.1° as a center which maximizes the diffraction efficiency, that FIG. 4 is not an approximately symmetrical graph with respect to 80.2° as a center which maximizes the diffraction efficiency. This is mainly due to the apex angle 6, and the asymmetry of the graph becomes conspicuous as the apex angle 6 exceeds about 85° (particularly 89° or higher).

This embodiment sets an offset value that is made by subtracting the second blaze angle from the first blaze angle so that the diffraction efficiency can pass its peak before the deformation of the blazed surface 3 is completed, and the offset value is between 0.25° and 1.2° as in the following conditional expression. In Expression 2, "bd" denotes the first blaze angle (such as 80.2° illustrated in FIG. 4), and "ba" denotes the second blaze angle (or the actual blaze angle 5).

$$0.25° \leq bd-ba \leq 1.2° \quad (2)$$

In Expression 2, the diffraction efficiency little improves in comparison with the conventional diffraction efficiency when the value is lower than the lower limit. For example, when the offset value is 0.25°, an initial value of ba is 79.95° and deteriorates as if it changed to 81.35°. Therefore, the diffraction efficiency changes from 99% to 82% through the extreme value of 100%, always becomes 82% or higher, and is better than the conventional diffraction efficiency.

The upper limit in Expression 2 attempts to maintain the durability and to stabilize the light source. The deterioration of durability is progressed by the ultraviolet radiation, and does not become stable unlike the deterioration of the diffraction efficiency. Although the upper limit lowers the initial efficiency, the relative increase trend can be obtained in the irradiation direction and it is set to have a nearly peak at the assumed life end stage so as to maintain predetermined average efficiency.

When the offset value is 1.2°, an initial value of ba is 79.0° and deteriorates as if it changed to 80.4°. Therefore, the diffraction efficiency changes from 73% to 99.7%.

The conventional diffraction efficiency decreases from 100% to 66% whereas the diffraction efficiency of this embodiment changes from 73% to 99.7% when the offset value is 1.2°. Therefore, the diffraction efficiency becomes always 73% or higher and better than the conventional diffraction efficiency. In addition, the conventional diffraction efficiency becomes stable at 66% whereas the diffraction efficiency becomes stable at 99.7% when the offset value is 1.2°. When they are compared with each other, a difference between both diffraction efficiencies is clear.

In Expression 2, the difference between the upper and lower limits is illustratively set to 0.95° in view of a manufacturing error, another bias, the initial efficiency, etc.

Expression 2 may be replaced by Expression 3 when the priority is put on the diffraction efficiency:

$$0.5° \leq bd-ba \leq 1.2° \quad (3)$$

From Expression 3, the initial value of ba is 79.7° when the offset value is the lower limit of 0.5° and it deteriorates as if it changed to 81.1°. Therefore, the diffraction efficiency changes from 95% to 90% through the extreme value of 100%, always becomes 90% or higher, and is better than the conventional diffraction efficiency.

Expression 3 may be replaced by Expression 4 when the priority is further put on the diffraction efficiency:

$$0.5° \leq bd-ba \leq 0.7° \quad (4)$$

From Expression 4, the initial value of ba is 79.5° when the offset value is the upper limit of 0.7° and it deteriorates as if it changed to 80.9°. Therefore, the diffraction efficiency changes from 91% to 92% through the extreme value of 100%, always becomes 91% or higher, and is better than the conventional diffraction efficiency.

Figure 5:
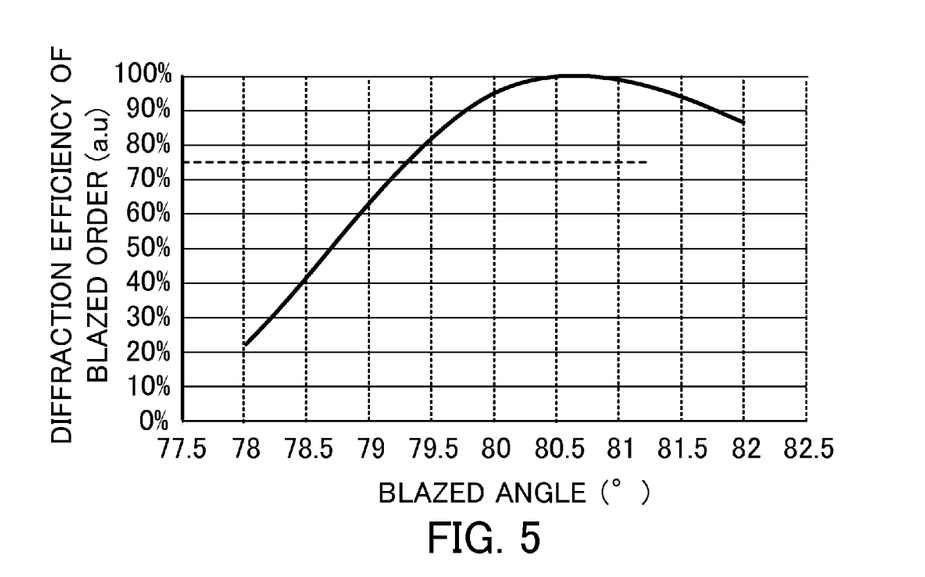
FIG. 5 is a graph illustrating a relationship between a blazed angle and diffraction efficiency of a blazed order when an apex angle is 89.92° in the Echelle diffraction grating illustrated in FIG. 1A.

FIG. 5 is a graph illustrating a relationship between the blaze angle 5 when the apex angle 6 is 89.92° and the diffraction efficiency of the blazed order. The abscissa axis denotes the blaze angle 5 (°) and the ordinate axis denotes the diffraction efficiency of the blazed order (arbitrary unit). As illustrated, the blaze angle has an angle that maximizes the diffraction efficiency. Thereby, a specific order is blazed.

This embodiment sets the offset value that is made by subtracting the second blaze angle from the first blaze angle so that the diffraction efficiency can pass its peak before the deformation of the blazed surface 3 is completed, and the offset value is between 0.25° and 1.2° as in Expression 2. In Expression 2, "bd" denotes the first blaze angle (such as 80.6° illustrated in FIG. 5), and "ba" denotes the second blaze angle (or the actual blaze angle 5).

In Expression 2, when the offset value is the lower limit of 0.25°, an initial value of ba is 80.35° and deteriorates as if it changed to 81.75°. Therefore, the diffraction efficiency changes from 99% to 90% through the extreme value of 100%, always becomes 90% or higher, and is better than the conventional diffraction efficiency.

When the offset value is 1.2°, an initial value of ba is 79.4° and it deteriorates as if it changed to 80.8°. Therefore, the diffraction efficiency changes from 80% to 99.7%.

The conventional diffraction efficiency decreases from 100% to 66% whereas the diffraction efficiency of this embodiment changes from 80% to 99.7% when the offset value is 1.2°. Therefore, the diffraction efficiency becomes always 80% or higher, and is better than the conventional diffraction efficiency. In addition, the conventional diffraction efficiency becomes stable at 66% whereas the diffraction efficiency becomes stable at 99.7% when the offset value is 1.2°. When they are compared with each other, a difference between both diffraction efficiencies is clear.

From Expression 3, when the offset value is the lower limit of 0.5°, an initial value of ba is 80.1° and deteriorates as if it changed to 81.5°. Therefore, the diffraction efficiency changes from 96% to 93% through the extreme value of 100%, always becomes 93% or higher, and is better than the conventional diffraction efficiency.

From Expression 4, when the offset value is the upper limit of 0.7°, an initial value of ba is 79.9° and deteriorates as if it changed to 81.3°. Therefore, the diffraction efficiency changes from 95% to 96% through the extreme value of 100%, always becomes 95% or higher, and is better than the conventional diffraction efficiency.

Even when there is no offset from the first blaze angle, the diffraction efficiency of this embodiment appears to be better than the conventional diffraction efficiency. However, in that case, the diffraction efficiency of the KrF excimer laser becomes worse, as described below. Alternatively, as described later, there are few or no selectable combinations of the blazed orders for two wavelengths of the ArF excimer laser and the KrF excimer laser.

As described above, the blaze angle that maximizes the diffraction efficiency of the set blazed order is set to the actual blaze angle in the prior art. The blazed order can be arbitrarily selected between the $100^{th}$ order and the $111^{th}$ order. In other words, the conventional method of setting the blaze angle sets the first blaze angle that maximizes the diffraction efficiency of the first blazed order to the actual blaze angle 5, or the second blaze angle that maximizes the diffraction efficiency of the second blazed order to the actual blaze angle.

On the other hand, this embodiment sets the second blaze angle smaller than the first blaze angle that maximizes the diffraction efficiency of the first blazed order, and is different from the prior art in blaze angle as well as in blazed order that is used. When the second blaze angle is set in the prior art, the blaze angle maximizes the diffraction efficiency of the second blazed order.

The set blazed order is invariable and constant irrespective of the lattice deformations caused by the irradiations. This angle is maintained constant when the incident angle θ of the incident light 2 illustrated in FIG. 1A is set and the (first) blazed order m is maintained constant from Expression 1.

Thus, this embodiment serves as a method of determining the blaze angle of the Echelle diffraction grating 1 or a method of manufacturing the Echelle diffraction grating 1. These methods include some steps, and each step can be implemented as a program (software) that enables the computer (processor), such as a PC to implement the function of each step.

Initially, a user manipulates an input unit of the computer and inputs the wavelength λ of Expression 1 (such as 193.3 nm), the blazed order m, and the repetition pitch d. The user can also set the apex angle 6.

In response, the computer acquires data corresponding to the first blazed order based upon the blaze angle dependency of the diffraction efficiency of the blazed order upon the blaze angle illustrated in FIG. 4 previously stored for each blazed order in the memory (storage) (not illustrated).

The computer acquires the first blaze angle (such as 80.2° illustrated in FIG. 4) that maximizes the diffraction efficiency of the first blazed order from the acquired data, and stores it. Next, the computer displays the incident angle θ from Expression 1 stored in the memory about the first blaze angle on a display unit.

The computer calculates the second blaze angle (such as 79.95° illustrated in FIG. 4) by subtracting the offset value that satisfies one of Expressions 2-4 stored in the memory from the first blaze angle, and displays the result. The computer may display the graph illustrated in FIG. 4 and changes of the second blaze angle and the diffraction efficiency on the display unit.

Figure 7:
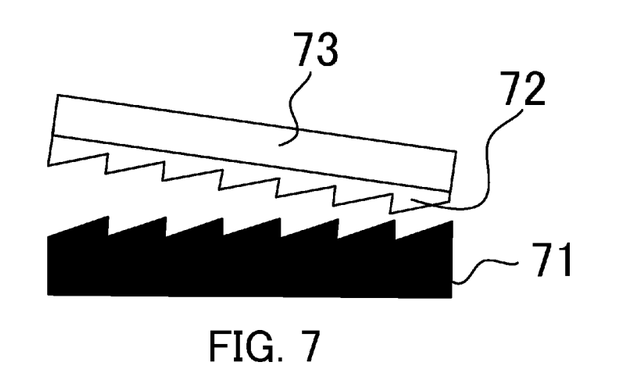
FIG. 7 is a sectional view for explaining a manufacturing method of an Echelle diffraction grating illustrated in FIG. 1A.

Afterwards, as illustrated in FIG. 7, an originally manufactured grating is set as a master 71 is used to produce a replica 72 by transferring a pattern of the master 71 onto a resin or aluminum layer of a blank (substrate) 73 as a structure.

When it is assumed that "f" is a reciprocal (f=1/d) of repetition pitch d of the grating, $1/d = f = 2 \sin \theta / m\lambda$ from Expression 1. Since $\sin \theta \le 1$, $f \le 2/(m\lambda)$ is the condition in which the light is incident and reflected in the Littrow configuration.

Now consider a condition of preventing high order light from propagating at least for the wavelength of 193.3 nm in the ArF excimer laser beam in the Littrow configuration: Assume that θ is an incident angle and a reflection angle in the Littrow configuration and θ' is an incident angle of the diffracted light higher by one order. Then, the following conditional expression is established from Expression 1 with respect to these angles:

$$m\lambda = 2d \cdot \sin \theta = 2 \cdot (\sin \theta)/f \quad (5)$$

$$(m+1)\lambda = d(\sin \theta + \sin \theta') = \{(\sin \theta + \sin \theta')\}/f \quad (6)$$

Since $\sin \theta = m\lambda f/2$ is met from Expression 5, the following conditional expression is obtained by substituting it for Expression 6:

$$\sin \theta' = (m/2+1)\lambda f \quad (7)$$

When $\sin \theta'$ is less than 1, high order propagating light occurs. Thus, it needs to be one or higher so as not to generate the high order propagating light. Hence, $2/\{(m+2)\lambda\} \le f$ is established from $1 \le (m/2+1)\lambda f$. In summary, the following expression is satisfied:

$$2/\{(m+2)\lambda\} \le f \le 2/(m\lambda) \quad (8)$$

This embodiment is applicable to an Echelle diffraction grating that can be commonly used for the excimer lasers having the two types of wavelengths, such as the ArF excimer laser and the KrF excimer laser (wavelength of 248.4 nm).

In this case, the instant inventors have discovered that the Echelle diffraction grating 1 applied to the ArF excimer laser behaves differently from that applied to the KrF excimer laser. That is, as described above, the energy amount of the laser beam of the KrF excimer laser is smaller and thus the influence of the reflective coating layer 12 (deterioration of the diffraction efficiency) on the blazed surface 3 can be ignored as long as the thicknesses of the resin layer 11 and reflective coating layer 12 are set as described above.

Although there is blaze angle dependency of the set blazed order as illustrated in FIG. 4 even in the KrF excimer laser, the blaze angle that maximizes the diffraction efficiency of the set blazed order can be set since the deterioration of the blazed surface 3 is negligible.

Japanese Patent No. 3,673,686 sets approximately common blaze angles that maximize the blazed orders for each of the ArF excimer laser and the KrF excimer laser. On the other hand, this embodiment sets a blaze angle that maximizes the diffraction efficiency of the set blazed order to the KrF excimer laser but a blaze angle smaller than the blaze angle that maximizes the set blazed order to the ArF excimer laser.

This will be described in detail in the following embodiments.

First Embodiment

As illustrated in Table 1, a maximum value and a minimum value of the period f are obtained from Expression 8 for the blazed order of the ArF excimer laser. This embodiment utilizes blazed orders from $100^{th}$ to $111^{st}$ of the ArF excimer laser:

TABLE 1

| 193 nm ORDER | F_MIN (period/mm) | F_MAX (period/mm) |
|---|---|---|
| 100 | 101.44 | 103.47 |
| 101 | 100.45 | 102.44 |
| 102 | 99.49 | 101.44 |
| 103 | 98.54 | 100.45 |
| 104 | 97.61 | 99.49 |
| 105 | 96.70 | 98.54 |
| 106 | 95.80 | 97.61 |
| 107 | 94.92 | 96.70 |
| 108 | 94.06 | 95.80 |
| 109 | 93.21 | 94.92 |
| 110 | 92.38 | 94.06 |
| 111 | 91.56 | 93.21 |

Figure 6:
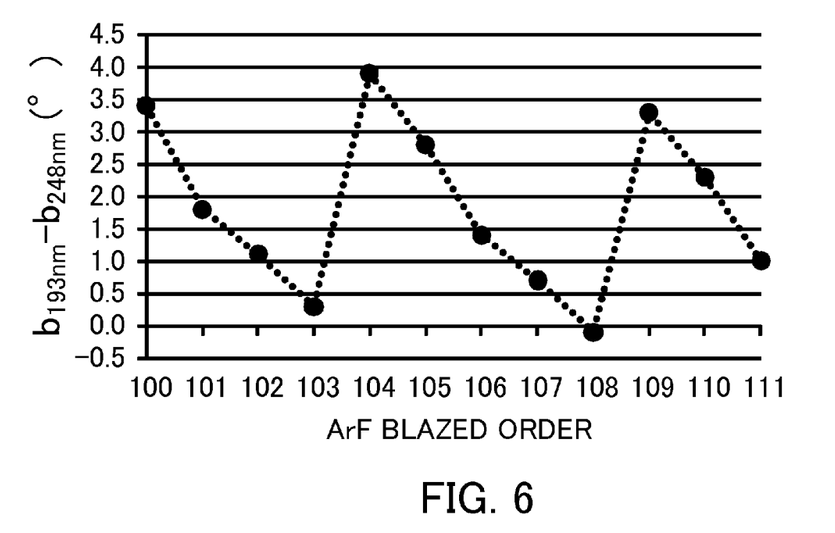
FIG. 6 is a graph illustrating a relationship between a blazed order of the ArF excimer laser and a difference of the blaze angle between the KrF excimer laser and the ArF excimer laser.

The efficiency is calculated with the apex angle 6 and blaze angle 5 based upon the above orders and suitable periods in the period range, a difference of optimal values of the blaze angles 5 for each wavelength is calculated, and a combination that satisfies Expression 3 (a range from 0.5 to 1.2) is summarized in Table 2. Herein, the blazed order between $77^{th}$ order and the $86^{th}$ orders of the KrF excimer laser are used. FIG. 6 expresses the result as a graph.

TABLE 2

| ArF ORDER | KrF ORDER | $b_{193\,NM}$-$b_{248\,NM}$ | FIRST EMBODIMENT |
|---|---|---|---|
| 100 | 77 | 3.40 | |
| 101 | 78 | 1.80 | |
| 102 | 79 | 1.10 | SELECTED |
| 103 | 80 | 0.30 | |
| 104 | 80 | 3.90 | |
| 105 | 81 | 2.80 | |
| 106 | 82 | 1.40 | |
| 107 | 83 | 0.70 | SELECTED |
| 108 | 84 | −0.10 | |
| 109 | 84 | 3.30 | |
| 110 | 85 | 2.30 | |
| 111 | 86 | 1.00 | SELECTED |

It is understood from FIG. 6 that the optimum values of the blaze angle 5 for the two wavelengths periodically change, and the selectable combinations of the blazed orders for two wavelengths of the ArF excimer laser and the KrF excimer laser are limited. In Table 2, those combinations of $b_{193nm}$-$b_{248nm}$ as the ordinate axis in FIG. 6 which satisfy Expression 3 are selected.

In other words, when the period f is set to 91.5859/mm and the apex angle 6 is 89°, the blaze angle 5 that maximizes the $111^{st}$ blazed order for the ArF excimer laser is 80.8° and the blaze angle 5 that maximizes the $86^{th}$ blazed order for the KrF excimer laser becomes 79.8°. Hence, there is a difference of +1.0° between both blaze angles.

Accordingly, the blaze angle 5 for the ArF excimer laser is reduced down to 79.8° by 1.0° according to Expression 3. As a result, the blaze angle that maximizes the diffraction efficiency of the set blazed order is set to the KrF excimer laser, and a blaze angle that is smaller than the blaze angle that maximizes the diffraction efficiency of the set blazed order is set to the ArF excimer laser.

Similarly, an angular difference between the blaze angle 5 that maximizes the $102^{nd}$ blazed order for the ArF excimer laser and the blaze angle 5 that maximizes the $79^{th}$ blazed order for the KrF excimer laser is 1.1° and thus between 0.5° and 1.2°. An angular difference between the blaze angle 5 that maximizes the $107^{th}$ blazed order for the ArF excimer laser and the blaze angle 5 that maximizes the $83^{rd}$ blazed order for the KrF excimer laser is 0.7° and thus between 0.5° and 1.2°. Similar effects in these combinations can be obtained by reducing the blaze angle for the ArF excimer laser by the angular difference according to Expression 3.

Second Embodiment

The first embodiment selects, as listed in Table 2, those combinations of $b_{193nm}$-$b_{248nm}$ as the ordinate axis illustrated in FIG. 6 which satisfy Expression 3. On the other hand, this embodiment, unlike the first embodiment, selects those combinations of $b_{193nm}$-$b_{248nm}$ as the ordinate axis illustrated in FIG. 6 which satisfy Expression 2. The following Table 3 selects the combinations in which the difference of optimum values of the blaze angles 5 for the respective wavelengths satisfies Expression 2. Herein, the blazed orders between $100^{th}$ order and the $111^{st}$ order of the ArF excimer laser and the blazed orders between $77^{th}$ order and the $86^{th}$ order of the KrF excimer laser are used.

TABLE 3

| ArF ORDER | KrF ORDER | $b_{193\,NM}$-$b_{248\,NM}$ | SECOND EMBODIMENT |
|---|---|---|---|
| 100 | 77 | 3.40 | |
| 101 | 78 | 1.80 | |
| 102 | 79 | 1.10 | SELECTED |
| 103 | 80 | 0.30 | SELECTED |
| 104 | 80 | 3.90 | |
| 105 | 81 | 2.80 | |
| 106 | 82 | 1.40 | |
| 107 | 83 | 0.70 | SELECTED |
| 108 | 84 | −0.10 | |
| 109 | 84 | 3.30 | |
| 110 | 85 | 2.30 | |
| 111 | 86 | 1.00 | SELECTED |

It is understood from FIG. 6 that the optimum values of the blaze angles 5 of the two wavelengths periodically change, and the selectable combinations of the blazed orders for the two wavelengths of the ArF excimer laser and the KrF excimer laser are limited.

In other words, when the period f is set to 91.5859/mm and the apex angle 6 is 89°, the blaze angle 5 that maximizes the $111^{st}$ blazed order for the ArF excimer laser is 80.8° and the blaze angle 5 that maximizes the $86^{th}$ blazed order for the KrF excimer laser becomes 79.8°. Hence, there is a difference of +1.0° between both blaze angles.

Accordingly, the blaze angle 5 for the ArF excimer laser is reduced down to 79.8° by 1.0° according to Expression 2. As a result, the blaze angle that maximizes the diffraction efficiency of the set blazed order is set to the KrF excimer laser, and a blaze angle that is smaller than the blaze angle that maximizes the diffraction efficiency of the set blazed order is set to the ArF excimer laser.

Similarly, an angular difference between the blaze angle 5 that maximizes the $102^{nd}$ blazed order of the ArF excimer laser and the blaze angle 5 that maximizes the $79^{th}$ blazed order of the KrF excimer laser is 1.1° and thus between 0.25° and 1.2°. An angular difference between the blaze angle 5 that maximizes the $103^{nd}$ blazed order of the ArF excimer laser and the blaze angle 5 that maximizes the $80^{th}$ blazed order of the KrF excimer laser is 0.3° and thus between 0.25° and 1.2°. An angular difference between the blaze angle 5 that maximizes the $107^{th}$ blazed order of the ArF excimer laser and the blaze angle 5 that maximizes the $83^{rd}$ blazed order of the KrF excimer laser is 0.7° and thus between 0.25° and 1.2°. Similar effects in these combinations can be obtained by reducing the blaze angle 5 for the ArF excimer laser by the angular difference according to Expression 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2011-222367, filed Oct. 6, 2011, and 2012-211640, filed Sep. 26, 2012, which are hereby incorporated by reference herein in their entirety.

What is claimed is:

1. An Echelle diffraction grating comprising a plurality of gratings, each of which has an asymmetrical triangular shape on a section in which the plurality of gratings are arranged,
   wherein each grating includes a resin layer made of light curing resin, and a reflective coating layer formed on the resin layer,
   wherein each grating receives and diffracts incident light on a blazed surface corresponding to a short side of the asymmetrical triangular shape,
   wherein an apex angle between the blazed surface and a counter surface corresponding to a long side of the asymmetrical triangular shape is between 85° and 90°,
   wherein a second blaze angle, which is a blaze angle between the blazed surface and a lattice plane, is smaller than a first blaze angle that maximizes diffraction efficiency of a set blazed order for incident light of a wavelength of 193.3 nm,
   wherein the following conditional expression is satisfied where bd denotes the first blaze angle, and ba denotes the second blaze angle:

$$0.25° \leq bd-ba \leq 1.2°,$$

wherein the second blaze angle maximizes the diffraction efficiency of a set blazed order for incident light having a wavelength of 248.4 nm,
   wherein the set blazed order for the incident light having the wavelength of 248.4 nm is set between $77^{th}$ order and $86^{th}$ order, and
   wherein combinations of the blazed order that is set for the incident light having the wavelength of 193.3 nm and the incident light having the wavelength of 248.4 nm include a $102^{nd}$ order and a $79^{th}$ order, a $107^{th}$ order and a $83^{rd}$ order, and a $111^{st}$ order and a $86^{th}$ order.

2. The Echelle diffraction grating according to claim 1, wherein the following conditional expression is satisfied:

$$0.5° \leq bd-ba \leq 1.2°.$$

3. The Echelle diffraction grating according to claim 1, wherein the following conditional expression is satisfied:

$$0.5° \leq bd-ba \leq 0.7°.$$

4. The Echelle diffraction grating according to claim 1, wherein the set blazed order is set between $100^{th}$ order and $111^{st}$ order.

5. The Echelle diffraction grating according to claim 1, wherein the following conditional expression is satisfied where f denotes a reciprocal of a repetition pitch of the grating, m is the set blazed order, and 2 is the wavelength of 193.3 nm:

$$2/\{(m+2)\lambda\} \leq f \leq 2/(m\lambda).$$

6. The Echelle diffraction grating according to claim 1, wherein combinations of the blazed order that is set for the incident light having the wavelength of 193.3 nm and the incident light having the wavelength of 248.4 nm further include a $103^{rd}$ order and an $80^{th}$ order.

7. An excimer laser comprising an Echelle diffraction grating according to claim 1.

8. An excimer laser comprising:
   a light source configured to emit light; and
   an Echelle diffraction grating according to claim 1.

9. The Echelle diffraction grating according to claim 1, wherein the Echelle diffraction grating has a Littrow configuration in which a direction of incident light accords with a direction of diffracted light.

* * * * *